Figure 1:
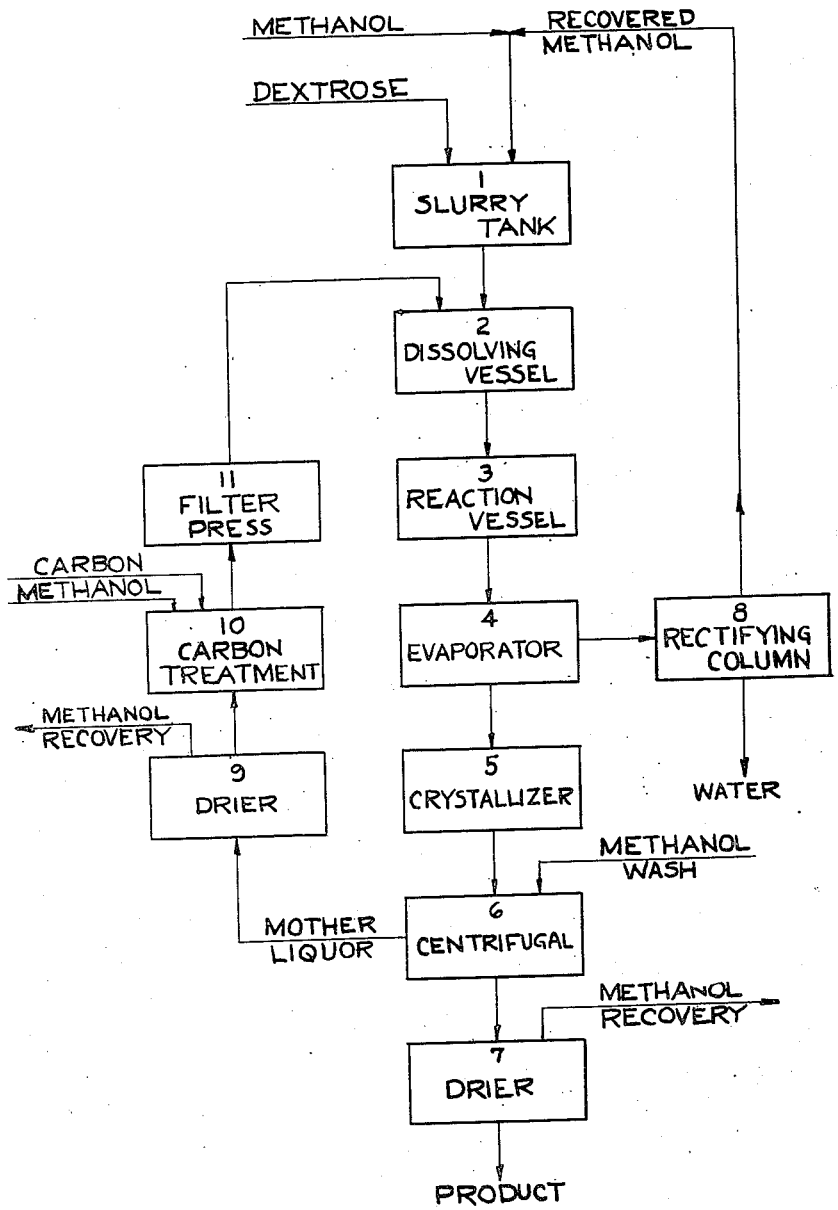

Aug. 5, 1952    G. R. DEAN ET AL    2,606,186
PREPARATION OF METHYL GLUCOSIDE
Filed Oct. 15, 1949    2 SHEETS—SHEET 1

PROCESS

INVENTORS
George R. Dean
Ronald E. Pyle
BY Mildred Oncken
AGENT

Aug. 5, 1952          G. R. DEAN ET AL          2,606,186
                PREPARATION OF METHYL GLUCOSIDE
Filed Oct. 15, 1949                        2 SHEETS—SHEET 2

CATALYST PREPARATION

INVENTORS
George R. Dean
Ronald E. Pyle
BY Mildred Oncken
        AGENT

Patented Aug. 5, 1952

2,606,186

UNITED STATES PATENT OFFICE 2,606,186

PREPARATION OF METHYL GLUCOSIDE

George R. Dean, Riverside, and Ronald E. Pyle, Bedford Park, Ill., assignors to Corn Products Refining Company, New York, N. Y., a corporation of New Jersey Application October 15, 1949, Serial No. 121,528

11 Claims. (Cl. 260—210)

This invention relates to an improved process for the preparation of glycosides, and more particularly methyl glucoside.

Various procedures for preparing methyl glucoside have been known heretofore. Previously known procedures for the direct preparation of methyl glucoside comprise reacting dextrose and methanol in the presence of strong acid catalysts in solution, a solution of hydrogen chloride gas in methanol being most commonly employed. These procedures present several disadvantages, particularly for commercial scale operation. The highest reported total yields of 55 percent to 68 percent of crystalline methyl glucoside have been obtained only after prolonged reaction time and at the expense of considerable darkening of the reaction mixture, which complicates the separation and purification of the product and increases the cost of manufacture. Perhaps the greatest disadvantage of these methods resides in the corrosive conditions employed, thus necessitating the use of special acid-proof materials in the equipment. If a volatile acid such as the generally used hydrogen chloride is employed, not only must corrosion of the reaction vessel and accessories be considered, but extra precautions are required to minimize escape of the acidic vapors into the air with consequent damage of surrounding plant installations and poor working conditions. These latter disadvantages may be largely eliminated if a non-volatile acid is used, but corrosion of process equipment utilized still presents a problem and in addition the product will contain residual acid as an impurity. This may be eliminated by neutralization, but further additional steps are then necessary to remove from the product traces of ash thus formed.

Accordingly, it is an object of this invention to provide an improved process for the production of methyl glucoside.

It is a further object of this invention to provide a process for the preparation of methyl glucoside in the presence of a non-corrosive catalyst.

It is also among the objects of this invention to provide a process for the production of methyl glucoside in good yields and of high quality, improved color, free of acid, ash, and organic impurities, by a process which does not require excessive reaction periods or lengthy and costly purification procedures.

Still another object is to provide a process for the preparation of methyl glucoside which is adapted to continuous operation.

Other objects and advantages will appear hereinafter.

The term "glucoside" is used herein to denote a dextrose or glucose derivative wherein the hydrogen of the hemi-acetal hydroxyl group of the dextrose molecule has been replaced with the radical of an alcohol.

We have discovered that methyl glucoside can be prepared by agitating a suspension of dextrose in methanol in the presence of a cation exchange material as catalyst. Upon completion of the reaction, the cation exchange material is removed from the reaction mixture which may be used directly or concentrated to a specific gravity such that spontaneous crystallization of the methyl glucoside will occur. Several crops of crystals may be obtained, after removal of excess alcohol, in total yields as high as 88 percent of the theoretical.

In addition to overcoming the above-described disadvantages, such as corrosive reaction conditions, and increasing the yield of crystalline product, the new catalyst contributes further to economical operation and convenience, particularly in commercial scale production, by the fact that it may be recovered and reused numerous times and avoids the necessity for and hazards of storing and handling large quantities of strong acids.

When dextrose and methanol react in the presence of a catalyst, they form a mixture of two isomeric glucosides, i. e., methyl alpha- and beta-glucoside together with a minor proportion of difficultly crystallizable by-products, probably of glucosidic nature. The reaction appears to consist of two consecutive steps: (1) rapid reaction of methanol and dextrose with consequent loss of reducing power, probably as the result of formation of non-crystallizable glucosidic intermediates; and (2) slow conversion of these hypothetical intermediates to the isomeric alpha- and beta-glucosides until an equilibrium is reached, the alpha form being present in greater proportion. Schematically, these steps may be represented as follows:

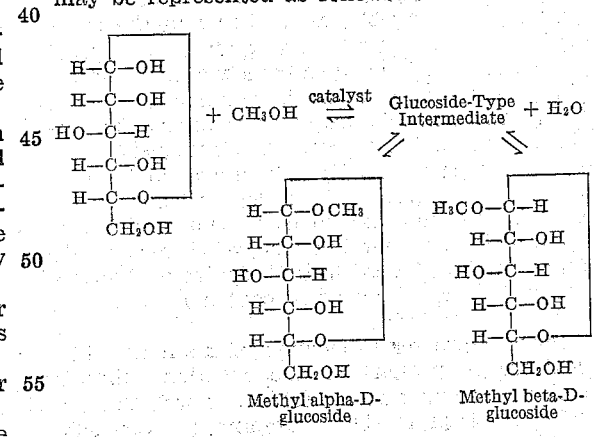

All reactions have been considered as reversible in the foregoing scheme on the basis that the glucosides may be hydrolyzed to dextrose and methanol in the presence of large amounts of water. Furthermore, alpha- and beta-glucosides may be interconverted in acid-alcohol solution, presumably through the intermediate compound. The two isomeric glucosides which may be obtained in crystalline form differ in solubility in the reaction mixture and in physical properties such as melting point and optical rotation. When the reaction is complete, the alpha isomer constitutes a major proportion of the crystalline product. Repeated fractional crystallization is necessary if the pure alpha or beta isomer is desired.

If a cation exchange material in the hydrogen state is substituted for the conventional acid catalyst, the reaction proceeds qualitatively as shown above. A striking difference is noted, however, in total yield of crystalline product. Whereas a total yield of crystalline methyl alpha- and beta-glucosides of 68 percent is about the highest reported employing an acid catalyst, yields as high as 88 percent have been obtained using the cation exchange material.

In the reaction in the presence of a cation exchange material as catalyst, it was noted that the relative proportions of methyl alpha- and beta-glucosides in the reaction mixture obtained were not substantially different whether the dextrose used was a mixture of alpha- and beta-sugars, pure alpha, or pure beta isomer, all other conditions being the same.

The exact nature of the reaction and role of the catalyst are not known at this time. It is of interest, however, to note some further experimental facts relating to the kinetics of the reaction. The proportion of methyl alpha-D-glucoside in the total crysalline product from the cation exchanger-catalyzed reaction is comparatively low. On the other hand, although total crystalline yield is much less in the acid-catalyzed reaction, the relative proportion of the alpha modification obtained is comparatively high. It is evident, therefore, that the mechanism of approach to equilibrium radically differs between the prior art acid catalysts and the cation exchange material catalysts.

Accordingly, the present invention differs from the prior art in more than mere replacement of strong acid by another catalyst. The cation exchange material appears to have some special property of modifying the chemical reaction in the direction of higher total yield of crystalline product.

Since water is formed in the reaction and the reaction is reversible, as is shown in the schematic representation and discussion thereof above, in accordance with the law of mass action, the presence of an appreciable amount of water in the reaction mixture tends to retard the production of methyl glucosides. Consequently anhydrous or substantially anhydrous starting materials are preferred. However, satisfactory results have been obtained using commercial dextrose hydrate (about 8 percent moisture content) and partially dehydrated dextrose hydrate (about 2 percent moisture content) as well as anhydrous dextrose.

Since a greater proportion of methanol than dextrose is present in the reaction mixture, methanol serving as the solvent as well as a reactant, it is preferable to use anhydrous or substantially anhydrous methanol. Commercial methanol made by the synthetic process is sufficiently free of water, however, to be suitable, as the moisture content is usually less than 1 percent.

In a continuous process which includes recycling of the mother liquors and/or recovered alcohol, there will be a build-up of water in the system and consequent reduction in yield unless some means, such as a fractionating column, is included in the process, for removal of the water before recycling.

In general, the percentage of water present in the reaction mixture, including water formed by the reaction, should preferably not exceed approximately 5 percent, although it is possible to carry out the process at moisture contents as high as about 20 percent.

With regard to the cation exchanger catalyst, any of the commercially available sulfonated-type cation exchangers may be used, and it is intended to refer to these materials when the terms "cation exchanger catalyst" and "cation exchange material" are used herein. For batchwise operation of the process, it is preferable, with a view toward economical operation, to use a cation exchanger of this type with sufficient physical stability to withstand constant agitation, so that it will not break down to fines, which would probably result in incomplete recovery of the catalyst for subsequent reuse.

Somewhat faster reaction rates may be procured if catalysts of smaller particle size, such as those with average particle diameters of about 0.35 mm. to 0.5 mm., are used, although the ordinary sulfonated-type cation exchangers on the market, of somewhat larger average diameter, are satisfactory. The increase in extent of reaction over a 24-hour period when using catalysts of the smaller particle size is considerably less than might be expected on the basis of increased surface area, but as a result of the larger surface area there is apparently some increase in the rate of solution of the sugar and in rate of conversion in the initial stage of the reaction.

Examples of satisfactory catalysts are the sulfonated phenol-formaldehyde cation exchange resins, such as that sold by the Resinous Products and Chemicals Company under the trademark "Amberlite IR–100" and that sold by the Chemical Process Company under the trademark "Duolite C–3"; the sulfonated polystyrene cation exchange resins, such as that sold by the National Aluminate Company under the trademark "Nalcite HCR" and that sold by the Dow Chemical Company under the trade-mark "Dowex 50"; and the sulfonated coal type of cation exchangers such as sold by the Permutit Company, under the trade-mark "Zeo-Karb H."

If the cation exchanger to be used as catalyst is not already in the "hydrogen state," i. e., eluted with an acid so that substantially all of its "exchangeable" cations are hydrogen ions, it is prepared for use by treatment with a dilute solution of acid in the manner commonly used in the regeneration of cation exchangers in demineralizing applications. However, once in the hydrogen state, it may be used repeatedly without regeneration or other treatment, as much as 400 pounds of dextrose having been processed per pound of catalyst before the latter required regeneration.

The relative proportions of dextrose and methanol used can be varied over a wide range. The preferred ratio is within the range of about 8.5 to about 45 moles of methanol per mole of dextrose. Over this range the extent of conversion to methyl glucoside within a given time decreases slightly with increasing dextrose concentration. It is possible to carry out the process of this invention using higher concentrations of dextrose, but increasing it appreciably above the dextrose to methanol ratio of 1:8.5 will result in precipitation of methyl glucoside during the course of the reaction, and it will then be necessary to use additional quantities of methanol or some other solvent for methyl glucoside to separate it from the catalyst. It is also possible to carry out the process of this invention with a dextrose concentration below the preferred range. However, the increase in extent of conversion or reaction velocity is not linearly related to decrease of dextrose concentration, so that any advantage gained in this respect will be small and usually more than offset by the disadvantages of handling large volumes.

The ratio of dextrose to catalyst can also be varied considerably, and the rate of reaction appears to be a function of this ratio also, though the relationship is not linear. Dextrose to catalyst ratios within the range of about 8:1 to 2:1 parts by weight are satisfactory. Below this range it becomes necessary to extend considerably the time of reaction necessary to approach completeness of conversion, while above this range there appears to be little advantage. In a continuous process wherein the dextrose-methanol solution is passed through a bed of catalyst, the effective ratio of dextrose to catalyst is determined by the rate of flow, lower flow rates giving lower dextrose to catalyst ratios.

Temperature appears to influence the rate of reaction more than concentrations of reactants or catalyst. Temperatures within the range of about 60° C. to about 100° C. give complete conversion without unduly prolonged reaction times. Some decomposition or fusion of the resin catalysts used appears to occur at temperatures appreciably above 100° C. However, if a sulfonated type cation exchanger catalyst were used which was more heat stable, higher temperatures could be employed. Reaction takes place at temperatures below about 60° C., even as low as room temperature, but the time required to approach maximum conversion would be excessive.

Reactions between dextrose and methanol run at reflux temperature of the methanol-dextrose solution (about 66° C.) gave 91.6 percent conversion (calculated as difference between 100 percent conversion and percent reducing sugar remaining) in 24 hours and 96.6 percent conversion in 48 hours. However, reactions run at 100° C. in sealed bombs resulted in 95 percent conversion in two hours, 96 percent in four hours, 96.5 percent in six hours, and 97 percent in eight hours, which appeared to be about maximum obtainable conversion since it was unchanged at the end of 16 hours.

Reaction times of 1 to 48 hours result in satisfactory completeness of conversion, depending upon the temperature of the reaction, and to some degree upon the concentrations of reactants and catalyst.

Obviously since the boiling point of methanol-dextrose solutions is about 66° C., the reaction must be carried out under pressure to achieve higher operating temperatures, the pressure depending on the temperature desired, in accordance with well-known scientific principles. The reaction may be considered as complete, for practical purposes, when the reducing sugar value of the mixture is about 4 percent or less.

The following examples, which are intended as informative and typical only and not in a limiting sense, will illustrate the invention:

EXAMPLE I

Preparation of catalyst

A 400 ml. water-packed bed of "Dowex 50" cation exchanger is conditioned for use in a glass column. The resin is placed in the hydrogen state by passing 1800 ml. of 10 percent hydrochloric acid through the bed in 60 minutes. A similar volume of distilled water is passed through in 60 minutes followed by additional distilled water at the rate of 100 ml. per minute to remove excess hydrochloric acid. The rinse is stopped when pH value of the effluent is 4.5 to 5.0.

The resin then is separated from the rinsing solution on a Buchner funnel and then washed two or three times on the funnel with methanol after which it is removed from the funnel and covered with methanol in a beaker. After soaking overnight, the resin is removed, and is ready for use as a catalyst in the preparation of methyl glucoside.

Procedure

A mixture of 80 g. (0.445 mole) of anhydrous dextrose, 200 ml. (158 g., 4.95 moles) of commercial methanol, and 20 g. of the cation exchanger catalyst prepared above is stirred at the boiling point. Under these conditions, the dextrose dissolves in 90 to 105 minutes. After 24 hours, the catalyst is separated by filtration and is washed with methanol. When the same resin is to be used in succeeding methyl glucoside preparations, it is possible to allow the resin to settle for about 10 minutes and then remove the reaction liquor by decantation. The resin is washed by decantation with small quantities of methanol. The combined mother liquor and wash solutions are evaporated on a steam bath to about three-fourths (180 ml.) of the volume of the original reaction liquor.

Methyl glucoside generally starts to crystallize from this concentrate before it has cooled completely to room temperature. After crystallization has started, the mixture is stirred occasionally to induce more rapid crystallization and to prevent caking of the product and allowed to crystallize overnight. The while crystalline needles are separated by filtration, washed with methanol, and air-dried. The weight of the first crop depends upon concentration of the solution, but in general amounts to 25–40 g. A second crop, weighing 25–35 g., is obtained by further concentration to about one-third (80–90 ml.) of the volume of the original reaction mixture. A third crop, weighing 5–10 g., is obtained on further evaporation. The time required for crystallization of the second and third crops is about one and three days, respectively. Total yield of product is 72–74 g. or 83–85 percent of theoretical.

The first crops, amounting to 25–30 percent of the total product, melt within a 160–164° C. range. Specific rotations of water solutions indicate that these crops contain from 95 to 97.5 percent methyl alpha-D-glucoside. Less pure first crops are obtained by increasing the size of the crops to 40 to 55 percent of the total product. The low melting points and low specific rotations of subsequent crops indicate that they contain much larger proportions of methyl beta-D-glucoside. Physical constants, weight, and calculated compositions of the three crops obtained in a typical run are given in Table I.

TABLE I
Preparation of methyl glucoside

| Crop | Weight (g) | M. P. °C. | $\alpha_D^{25}$ | α-Isomer, Percent | β-Isomer, Percent |
|---|---|---|---|---|---|
| 1 | 17 | 160–164 | 149.3 | 95 | 5 |
| 2 | 25 | 102–150 | 52.8 | 45 | 55 |
| 3 | 15 | 101–134 | 41.5 | 39 | 61 |

EXAMPLE II

The resin from Example I without further treatment was used to prepare a second bath of methyl glucoside under the same conditions. The final reducing sugar content after 24 hours was slightly lower (2.9 percent). Total yield of crystalline product amounted to 85.5 percent of theory. Repetition of these experiments with both fresh and used resin has confirmed the observation that its activity is improved slightly after use. One batch of the resin has been used 12 times without further treatment and with no loss of activity.

EXAMPLE III

Two additional preparations of methyl glucoside were carried out as described in Example I except that 10 g. of catalyst were used in one case and 40 g. in the other in place of 20 g. Results are shown in Table II.

TABLE II
Effect of catalyst concentration

| Dowex 50 Cation Exchanger (g) | Dextrose-Catalyst Ratio | Extent of Conversion, Percent | |
|---|---|---|---|
| | | 24 Hours | 48 Hours |
| 10 | 8:1 | 88.5 | 95.7 |
| 20 | 4:1 | 95.7 | 97.5 |
| 40 | 2:1 | 97.1 | 1 97.6 |

1 At 30 hours.

EXAMPLE IV

Eighty grams of anhydrous dextrose, 200 ml. of commercial methanol, and 20 g. of "Duolite C–3" cation exchanger, conditioned for use as in Example I, were stirred at reflux temperature for 48 hours. Conversion to methyl glucoside reached 95 percent in 24 hours and 97 percent in 48 hours.

EXAMPLE V

Example IV was repeated using 20 g. of "Amberlite IR–100" cation exchanger, as the catalyst. Conversion was 93 percent complete in 24 hours and 96 percent complete in 48 hours.

EXAMPLE VI

Example IV was repeated using as catalyst 20 g. of "Zeo-Karb H" cation exchanger. Conversion was 90 percent complete in 24 hours and 96 percent complete in 48 hours.

EXAMPLE VII

Effect of temperature on rate of formation of methyl gulcoside from dextrose and methanol in the presence of a cation exchanger catalyst was examined by small-scale conversions at 100° C. Each of eight tantalum bombs was charged with 8 g. of anhydrous dextrose, 2 g. of "Nalcite HCR" cation-exchange resin and 20 ml. of commercial methanol. The bombs were sealed and rotated in an oil bath at 100° C. for 0.25 to 16 hours. The vapor pressure of methanol at 100° C. is 36 p. s. i. Converted liquors were separated from the catalyst and analyzed for reducing sugars. A comparison of conversions made at 100° C. and 66° C. with the "Nalcite HCR" cation exchanger is shown in Table III.

TABLE III
Effect of temperature on preparation of methyl glucoside

| Conversion Time (hr.) | Conversion, Percent — | |
|---|---|---|
| | at 100° C. | at 66° C. |
| 0.25 | 66 | |
| 0.5 | 78 | |
| 1.0 | 87 | |
| 2.0 | 95 | |
| 4.0 | 96 | 62 |
| 6.0 | 96.5 | 69 |
| 8.0 | 97 | |
| 16.0 | 97 | |
| 24.0 | | 91.6 |
| 48.0 | | 96.6 |

EXAMPLE VIII

Figure 2:
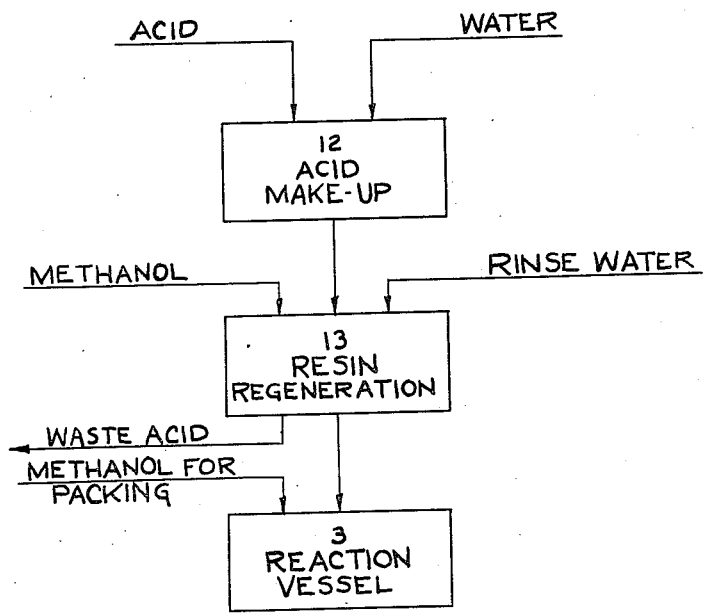

The accompanying drawings are flow sheets illustrating one type of system suitable for the application of the invention to a continuous process, such as described below. Figure 1 illustrates one form of an installation for producing methyl glucosides by our new process; Figure 2 illustrates one form of accessory equipment for catalyst preparation.

Preparation of Catalyst

Although the catalyst might be prepared and regenerated directly in the reaction vessel 3, this would require that the latter be acid proof. Rubber-lined vessels would be suitable at low temperatures but otherwise would probably fail. Accordingly, it is recommended that a separate system of acid resisting equipment be used for the catalyst preparation.

The catalyst is water-packed into the column 13 and a 10 percent aqueous solution of hydrochloric acid, prepared in acid make-up tank 12, is passed through the bed in the proportion of 34 gallons per cubic foot of resin and at such a rate to give a total contact time of 60 minutes. Ion-free water is then passed through the bed at the same flow rate until the effluent pH is 4.5 or higher. The bed is drained as completely as possible and then covered with methanol. After several changes of methanol, allowing soaking periods of one to two hours each, the catalyst is methanol-packed into the reaction vessel 3.

Operation of process

A slurry of anhydrous dextrose and commercial methanol in quantities sufficient to make a 30 percent dry substance solution is made up in tank 1. It is then pumped into the heated dissolving vessel 2, provided with a false bottom, where prepared "Nalcite HCR" catalyst is added in an amount equivalent to 25 percent of the dry substance present, and the mixture heated and agitated until the dextrose is in solution. Solution drawn through the false bottom in the dissolving vessel 2 is pumped up-flow through a column of prepared "Nalcite HCR" catalyst in the reaction vessel 3, which is a vitreous-lined, jacketed column, the jacket of which is maintained at about 230° F. with live steam.

Results obtained in this continuous reaction process are summarized below.

TABLE IV

| Temperature[1] | LHSV[2] | Percent Reducing Sugar in Product |
|---|---|---|
| °F. | | |
| 200 | 0.9 | 3.7 |
| 210 | 0.6 | 3.2 |
| | 0.9 | 4.0 |
| | 1.2 | 4.3 |
| | 1.5 | 5.7 |
| | 1.8 | 5.9 |
| | 2.4 | 7.4 |
| | 3.6 | 10.2 |

[1] Temperature within resin bed.
[2] Liquid hourly space velocity, ml. feed per hour, per ml. of catalyst.

The reaction mixture proceeds to an evaporator 4 where methanol is removed by flashing. The evacuated liquor proceeds to a crystallizer 5. This is not a difficult step and is well suited for continuous crystallization. The operation is best carried out in two steps, mother liquor from the first crop being concentrated. Otherwise the high solids content would render the magma too stiff for convenient handling.

Crystalline glucoside is separated in the centrifugal 6 and washed with a small amount of methanol. The solid product proceeds to drier 7 where residual methanol is removed. The mixture of crystalline glucosides may be packaged at this point or used as an intermediate for other processes.

The mother liquor, which at this point is a heavy syrup, proceeds to drier 9. Methanol and residual water are removed. Fresh methanol is then used to dissolve the residue and activated carbon is added in tank 10, since a very small amount of coloring matter forms during the original reaction and in cyclic process this should be removed to prevent build-up. The methanol solution is filtered in press 11 and then fed back to dissolving vessel 2.

Methanol removed in evaporator 4 and driers 7 and 9 is cycled to rectifying column 8 where water is removed. The methanol recovered in rectifying column 8 is then reused in the slurry tank 1.

About 86 pounds of crystalline methyl glucoside will be obtained from 100 pounds dextrose fed to the process and about 22 pounds of mother liquor dry substance will be returned to process. The mother liquor contains difficulty crystallizable material which becomes available as crystallizable glucosides during the reaction.

The original reaction mixture after conversion of dextrose to methyl glucosides will contain 3.2 percent by weight water as a product of the reaction. This water content, if not removed before recycling of mother liquor and recovered methanol, will seriously retard the reaction. Some system of water removal is necessary and a suggested plan is shown on the foregoing flow sheet. Methanol which has been recovered from evaporators and driers is passed through a fractionating column 8 before proceeding back to the dextrose dissolving system 1.

EXAMPLE IX

The reaction apparatus used for the following experiments consisted of a feed reservoir, feed chamber, 500 ml. reaction chamber, and calibrated receiver. The reaction chamber and feed line were heated electrically and the system was pressurized with air to permit operation above the boiling point of methanol liquors.

To operate the system, methanol was circulated while the reaction chamber was heated to the desired temperature. Feed solution was then introduced up-flow and after 750 ml. of effluent had been collected, collection of samples was started.

A stock solution was prepared by refluxing with stirring, 2400 g. of dextrose hydrate dehydrated to 2.2 percent moisture, 6000 ml. of commercial methanol, and 900 g. of "Nalcite HCR" as catalyst for two hours. After removal of the catalyst and dilution to 8 liters with methanol, the solution contained 30.6 percent dry substance and 41 percent reducibles (dry basis). Duplicate tests were made by operating the system at a 0.9 liquid hourly space velocity and at 210°–215° F. for four and one-half hours. Samples were collected for half-hour periods. The results of these tests are given in Table V.

EXAMPLE X

The reaction system described in Example IX and the same method of operation were used in carrying out the following experiment.

The stock solution was prepared from 3960 g. of dextrose hydrate (about 8 percent moisture content), 9000 ml. of commercial methanol, and 1350 g. of "Nalcite HCR" as catalyst. This solution was diluted to 12 liters, after the preliminary dissolving operation as above, with methanol and contained 33.2 percent dry substance and 50.5 percent reducibles (dry basis). Duplicate test results obtained, as described in Example IX, are given in Table V.

TABLE V

*Preparation of methyl glucoside from dextrose hydrate*

| Sample | Reducing Value (Percent Dry Basis) | | | |
|---|---|---|---|---|
| | Dextrose Hydrate 2 Percent Moisture | | Dextrose Hydrate 8 Percent Moisture | |
| | I | II | I | II |
| 1 | 2.4 | 2.5 | 3.5 | 2.3 |
| 2 | 3.2 | 3.4 | 4.5 | 4.0 |
| 3 | 3.3 | 3.4 | 4.6 | 4.2 |
| 4 | 3.2 | 3.7 | 4.7 | 4.2 |
| 5 | 3.4 | 3.7 | 4.7 | 4.2 |
| 6 | 3.4 | 3.8 | 4.7 | 4.0 |
| 7 | 3.7 | 3.8 | 4.8 | 4.4 |
| 8 | 3.6 | 3.7 | 4.5 | 4.4 |
| 9 | 3.6 | 3.5 | | |

It is not necessary to use a partially reacted dextrose-methanol solution, such as was employed in Examples VIII, IX and X, in continuous operation. Batch-wise addition of cation exchanger catalyst in the dissolving step was used in these examples merely because it afforded a convenient manner of obtaining sufficient dissolution of dextrose in the methanol for subsequent continuous operation at the solids concentration described. Heating methanol and dextrose, with or without the addition of catalyst, under super-atmospheric pressure also affords a rapid dissolution process, and results in high dextrose concentration. Dextrose and methanol may also be heated alone at atmospheric pressure. However, the latter method requires a somewhat longer period of time to achieve substantially complete dissolution and the concentration of dextrose in methanol is lower.

The products of the invention are useful as intermediates in the preparation of various derivatives of dextrose. In many cases, the reaction mixtures may be used directly in further reactions since they contain substantially only excess methanol, methyl glucosides, and small quantities of water and unreacted dextrose. They are convenient starting materials for any reaction requiring a dextrose compound with a protected aldheyde or carbonyl group.

The process described herein is also applicable to the reaction of methanol with reducing sugars other than dextrose; e. g. arabinose, xylose, galactose, mannose, maltose, etc. It is further applicable to the reaction of dextrose and other reducing sugars wtih hydroxy compounds other than methanol, such as ethanol, allyl alcohol, benzyl alcohol, ethylene chlorohydrin, ethylene glycol, propylene glyco, glycero, and hydroxy acids derivatized to prevent reaction of the carboxy group.

We claim:

1. A process for the production of methyl glucoside, comprising reacting dextrose with methanol in the presence of a sulfonated-type cation exchange material, in the hydrogen state, as catalyst, at a temperature within the range of about 60° C. to about 100° C.

2. A process for the production of methyl glucoside, comprising reacting dextrose with methanol in the presence of a sulfonated-type cation exchange material, in the hydrogen state, as catalyst, at a temperature within the range of about 60° C. to about 100° C., until the reducing sugar content of the reaction mixture is 4 percent or less.

3. A process for the production of methyl glucoside which comprises reacting dextrose with methanol in the presence of a sulfonated-type cation exchange material, in the hydrogen state, as catalyst, the moisture content of said reaction mixture not exceeding approximately 5 percent.

4. A process for the production of methyl glucoside comprising reacting anhydrous dextrose with substantially anhydrous methanol in the presence of a sulfonated type cation exchange material, in the hydrogen state, as catalyst, at a temperature within the range of about 60° C. to about 100° C.

5. A process for the production of methyl glucoside, comprising reacting 80 parts by weight of dextrose with 160 parts by weight of commercial methanol in the presence of from about 10 parts to about 40 parts by weight of a sulfonated-type cation exchange material, in the hydrogen state, as catalyst, at a temperature within the range of about 60° C. to about 100° C. for a period of about 1 hour to about 48 hours, and separating the catalyst and reaction mixture.

6. A process for the production of methyl glucoside, comprising reacting dextrose and methanol in the presence of a sulfonated-type cation exchange material, in the hydrogen state, as catalyst, the molar ration of dextrose to methanol in said reaction mixture being within the range of about 1:8.5 to about 1:45, and the ratio of catalyst to dextrose being within the range of about 1:2 to about 1:8 parts by weight.

7. A continuous process for the production of methyl glucoside, comprising passing a solution of dextrose in methanol through a bed of a sulfonated-type cation exchange material, in the hydrogen state, as catalyst, maintained at a temperature of about 200° F. to about 210° F., said solution being fed to said catalyst bed at a rate of about 0.6 to about 3.6 ml. per hour per ml. of catalyst, the concentration of dextrose in said dextrose-methanol solution being about 20 percent to 40 percent by weight.

8. A continuous process for the production of methyl glucoside, comprising passing a solution of dextrose in methanol through a bed of a sulfonated-type cation exchange material, in the hydrogen state, as catalyst, maintained at a temperature of about 200° F. to about 210° F., the concentration of dextrose in said solution being about 20 percent to 40 percent by weight, and said solution being fed to said catalyst bed at the rate of about 0.6 to about 3.6 ml. per hour per ml. of catalyst, recovering methyl glucoside and unreacted methanol from the reaction mixture, removing water from said recovered methanol, and recycling said recovered methanol for reaction with further quantities of dextrose.

9. A continuous process for the production of methyl glucoside, comprising passing a solution of dextrose in methanol through a bed of a sulfonated-type cation exchange material, in the hydrogen state, as catalyst, maintained at a temperature of 200° F. to 210° F., the concentration of dextrose in said solution being about 20 percent to 40 percent by weight and said solution being fed to said catalyst bed at the rate of about 0.6 to about 3.6 ml. per hour per ml. of catalyst, recovering methyl glucoside from unreacted methanol and dextrose, removing water from said unreacted methanol and dextrose, and recycling said unreacted liquid.

10. A continuous process for the production of methyl glucoside comprising passing a partially reacted solution of dextrose and methanol through a bed of a sulfonated-type cation exchange material, in the hydrogen state, as catalyst, maintained at a temperature of about 200° F. to about 210° F., the concentration of dextrose in said dextrose-methanol solution being about 20 percent to 40 percent by weight and said solution being fed to said catalyst bed at a rate of about 0.6 to about 3.6 ml. per hour per ml. of catalyst, recovering methyl glucoside and unreacted methanol from the reaction mixture, removing water from said recovered methanol, and recycling said recovered and rectified methanol for reaction with further quantities of dextrose.

11. A continuous process for the production of methyl glucoside comprising passing a solution containing dextrose dissolved in methanol through a bed of a sulfonated-type cation exchange material, in the hydrogen state, as catalyst maintained at a temperature of about 200° F. to about 210° F.; recovering methyl glucoside and unreacted components from the effluent from said catalyst bed; recycling said unreacted components until the moisture content of the unreacted components recovered exceeds 8 percent and then removing water from said recoverd unreacted components and recycling said recovered and rectified unreacted components.

GEORGE R. DEAN.
RONALD E. PYLE.

REFERENCES CITED

The following references are of record in the file of this patent:

Sussman: Ind. Eng. Chem., v. 38 (1946), p. 1228–2130, 3 pages.

Pigman: "Carbohydrate Chemistry" (1948), p. 186–192, 7 pages.

Nachod: "Ion Exchange," 1949, p. 261–273, 13 pages.